United States Patent [19]
McMurray

[11] 3,882,369
[45] May 6, 1975

[54] CONTROL OF CYCLOCONVERTER SYSTEMS HAVING A PARALLEL RESONANT COMMUTATION CIRCUIT

[75] Inventor: William McMurray, Schenectady, N.Y.

[73] Assignee: General Electric Company, Schenectady, N.Y.

[22] Filed: Nov. 28, 1973

[21] Appl. No.: 419,490

[52] U.S. Cl. .......................... 321/6; 321/7; 321/66
[51] Int. Cl. ............................................. H02m 5/16
[58] Field of Search ............ 321/6, 7, 43, 44, 43 R, 321/45 C, 45 ER, 66, 69; 219/10.77; 331/113 S; 318/227, 231; 323/102, 119

[56] References Cited
UNITED STATES PATENTS

| | | | |
|---|---|---|---|
| 3,319,147 | 5/1967 | Mapham | 321/6 |
| 3,448,368 | 6/1969 | Brouwer | 321/45 R |
| 3,466,525 | 9/1969 | Ainsworth | 321/38 |
| 3,566,148 | 2/1971 | Wood | 321/45 R |
| 3,718,852 | 2/1973 | Bailey | 219/10.77 |
| 3,742,336 | 6/1973 | Bedford | 321/7 |

Primary Examiner—William H. Beha, Jr.
Attorney, Agent, or Firm—Donald R. Campbell; Joseph T. Cohen; Jerome C. Squillaro

[57] ABSTRACT

A high frequency link cycloinverter and cycloconverter system having a parallel resonant comutation circuit operated at a variable frequency to control the reactive power available for commutation of the thyristors or other controlled power devices. A firing circuit component for computing the timing of a cycloconverter firing angle retard limit signal for an incoming device provides as a minimum a predetermined constant turn-off time for the outgoing device. For the cycloinverter system added turn-off time is computed to allow for simultaneous inverter and cycloconverter commutations at the retard limit. The control circuit and method utilizes sensed instantaneous power circuit parameters from which the state of the commutating capacitor voltage can be predicted, and a computation circuit for timing the generation of the retard limit signal.

20 Claims, 18 Drawing Figures

CONTROL OF CYCLOCONVERTER SYSTEMS HAVING A PARALLEL RESONANT COMMUTATION CIRCUIT

BACKGROUND OF THE INVENTION

This invention relates to controlling cycloconverter systems which have an intermediate parallel resonant commutation circuit. More particularly, the invention relates to a cycloconverter firing circuit and method for deriving firing angle retard limit signals based on a constant turn-off time criteria.

In U.S. Pat No. 3,742,336 to B. D. Bedford, granted June 26, 1973 and assigned to the same assignee, there is described a solid state power conversion system comprised by a high frequency inverter that feeds an output cycloconverter and supplies adjustable voltage and frequency to an inductive load, such as an ac motor. Variable commutation energy is provided by a parallel resonant circuit operated above its resonant frequency. The amount of commutatinge energy is controlled by adjusting the inverter operating frequency and increases as the frequency is increased, since the capacitor power increases while the inductor power decreases as the frequency is raised. For light loads the frequency is just above the resonant frequency, while for heavy loads the operating frequency is increased so that there is a higher capacitor voltage for commutation. These systems are also constructed as a pair of cascaded cycloconverters with a high frequency link employing an input cycloconverter operated in the regenerative mode, and other variations are discussed in the Bedford patent.

In application Ser. No. 416,006, filed on Nov. 15, 1973 by the inventor, assigned to the same assignee, the constant turn-off time control circuit and method for controlling inverters and other converters with a parallel L-C commutation circuit is disclosed and claimed broadly. It is there stated these inverters have been used for induction heating and other applications to supply high frequency power to a load where the exact value of the frequency is not critical. Different control methods for such circuits have been described in the prior art. One control technique assumes the capacitor voltage will be approximately sinusoidal and attempts to maintain a constant phase angle margin. Thus at the lower end of the frequency range the turn-off time is longer than necessary. Another scheme uses a phase-locked loop in which a signal proportional to the phase lead angle is fed back to a voltage-controlled oscillator. A constant margin angle is maintained instead of actual margin time and this control is, furthermore, slow in response. While response tiime is not critical for induction heating, where the load changes slowly, it is important when the load converter is a cycloconverter that can switch rapidly.

The present invention is directed to an improved firing circuit for producing firing angle retard limit signals in high frequency link cycloconverter systems which may have a constant turn-off time control circuit for establishing the operating frequency of the L-C commutation circuit. The constant time constant time control technique assures that the net reactive power of the parallel resonant commutation circuit exceeds that required by the load by just the right amount to provide commutation for the power devices. The need to allow a considerable safety factor for the turn-off time to avoid commutation failures is not as great, since the converter is monitored continuously and deals more effectively with transients, load impedance variations, and rapid reversals of the load current caused by switching of the power devices. In any cycloconverter, firing angle advance and retard limits must be established with provision for firing the thyristors or other power devices at an adjustable angle within these limits. The latter is of interest, since the advance limit is at the commutating capacitor voltage zero or shortly thereafter. Similar to the turn-off time allowances, prior firing angle retard limits are based on a constant angle criteria rather than a constant turn-off time criteria irregardless of the frequency.

SUMMARY OF THE INVENTION

In accordance with the invention, a firing circuit for a dual converter system including at least one cycloconverter or other phase controlled converter has means for generating a firing angle retard limit signal which computes, as a minimum, a predetermined constant turn-off time for an outgoing controlled power device. These systems have parallel resonant commutation circuit means operated at a variable frequency, typically a high frequency, to control the reactive power for commutation. in the dual polyphase cycloconverter system, retard limit signal means comprising a constant turn-off time control circuit for each cycloconverter is suitable since simultaneous commutations in the input and output cycloconverters do not occur for either direction of power flow. In the cycloinverter system, conversely, the simultaneous commutations in the inverter and cycloconverter, as when the cycloconverter is regenerating, require the computation of added turn-off time at least sufficient to commutate current from the outgoing cycloconverter device to the incoming device being fired at the retard limit. Preferably, the inverter constant turn-off time control circuit is used with additional circuitry to compute the added turn-off time.

The portion of the complete firing circuit for generating a firing angle retard limit signal includes sensing means for sensing a plurality of power circuit parameters indicative of the commutating capacitor voltage and current, and also computation means for generating a cyclically varying retard limit control signal that is compared with a reference to produce the retard limit signal. In the dual polyphase cycloconverter system the power circuit parameters are the totalized parameters such as the summed commutating capacitor voltage and present current, and the summed instantaneous cycloconverter current for all the phases of the input converter or output converter. In a preferred arrangement, the first two are provided in common in generating separate retard limit signals for the input and output converters. In the cycloinverter system, the additional circuitry beyond the inverter constant turn-off time control circuit includes individual cycloconverter phase current sensors so that individual retard limit signals are generated, or a common current sensor so that a single retard limit signal for all the phases is generated. Typically the sensing and computation means includes one or more potential transformers for the capacitor voltage, a plurality of current transformers, a burden resistor associated with each current transformer, and a comparator for determining the control signal zero-crossing and generating the retard limit signal. A control method for these converter sys-

DESCRIPTION OF THE PREFERRED EMBODIMENTS

Figure 9:
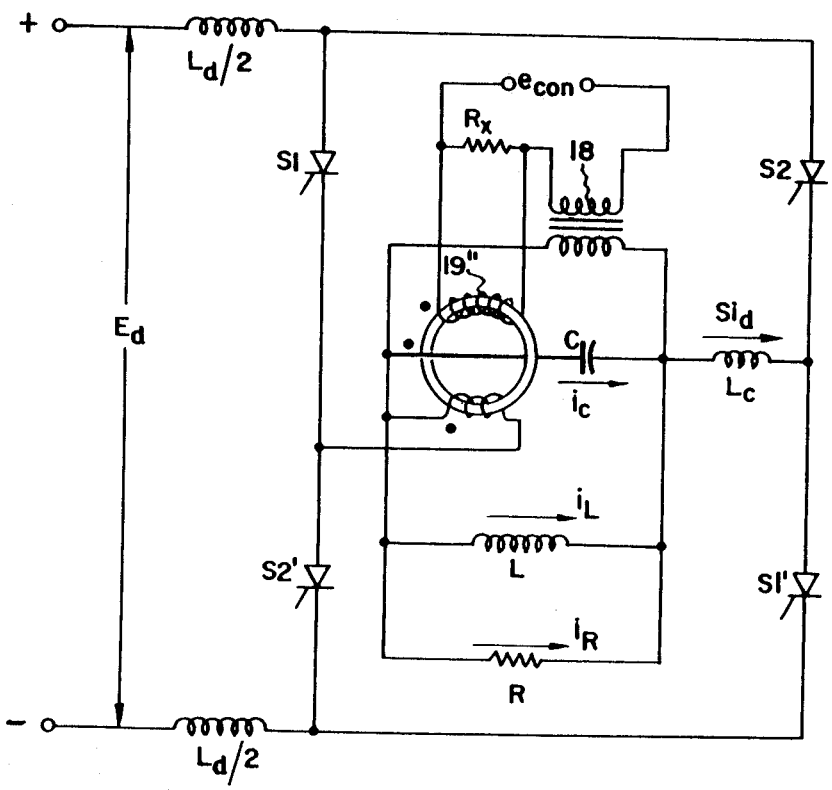
FIG. 9 is a schematic circuit diagram of the inverter with the feedback diodes and associated circuitry omitted, illustrating a different configuration of the sensing devices and circuitry for obtaining the control signal.
Figure 10:
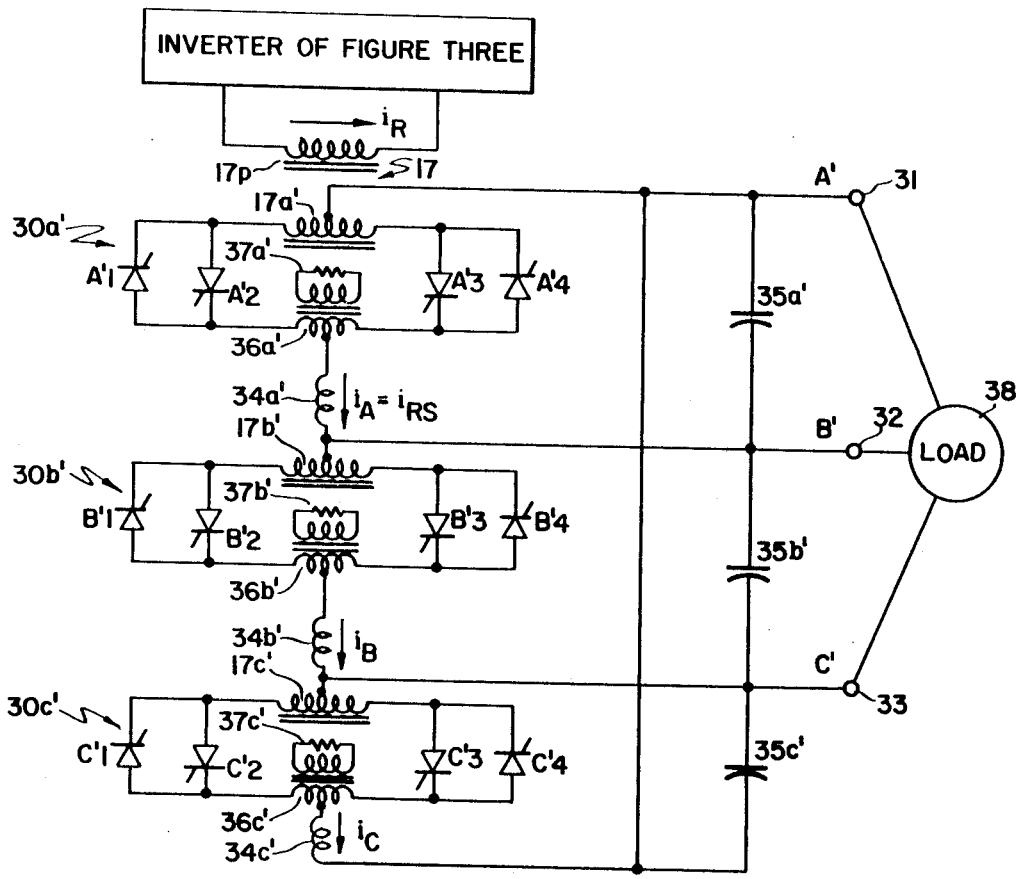
FIG. 10 is a schematic circuit diagram, partly in block diagram form, of a cycloinverter system with a parallel resonant commutation circuit and the additional sensing devices needed to obtain a control signal for the output cycloconverter firing angle retard limit signals.

The high frequency link cycloinverter and cycloconverter systems illustrated and discussed in FIGS. 10–16 are the embodiments used to explain the principles of the invention. However, the input inverter shown in block diagram form in FIG. 10 is essentially the inverter illustrated in detail in FIG. 3 and whose construction and operation, together with a few of the possible modifications, are explained with regard to FIGS. 1–9. For this reason and others which will become apparent, a full discussion of FIGS. 1–9 is essential to an understanding of the present invention, which involves an extension of this basic teaching of a constant turn-off time control circuit to the derivation of cycloconverter firing angle limit stop signals. The subject matter of FIGS. 1–9 is disclosed and claimed in the concurrently filed application Ser. No. 416,006, filed on Nov. 15, 1973 and major portions of the specification are repeated here with the exception of equations (8) to (17) relating to overlap compensation when the inverter includes the series current-limiting commutating inductors $L_c$ and $L_{cf}$. In this application the result only is given although for the sake of consistency the numbering of the equations remains the same. Although the cycloconverters in the preferred embodiments are full wave converters implemented with solid state thyristors, the invention in its broader scope is applicable to half wave converters and those using other controlled power devices and controlled rectifiers including the mercury arc rectifier and the ignitron. This invention is also applicable to a high frequency link inverter-phase controlled rectifier system for producing d-c voltage.

Figure 1:
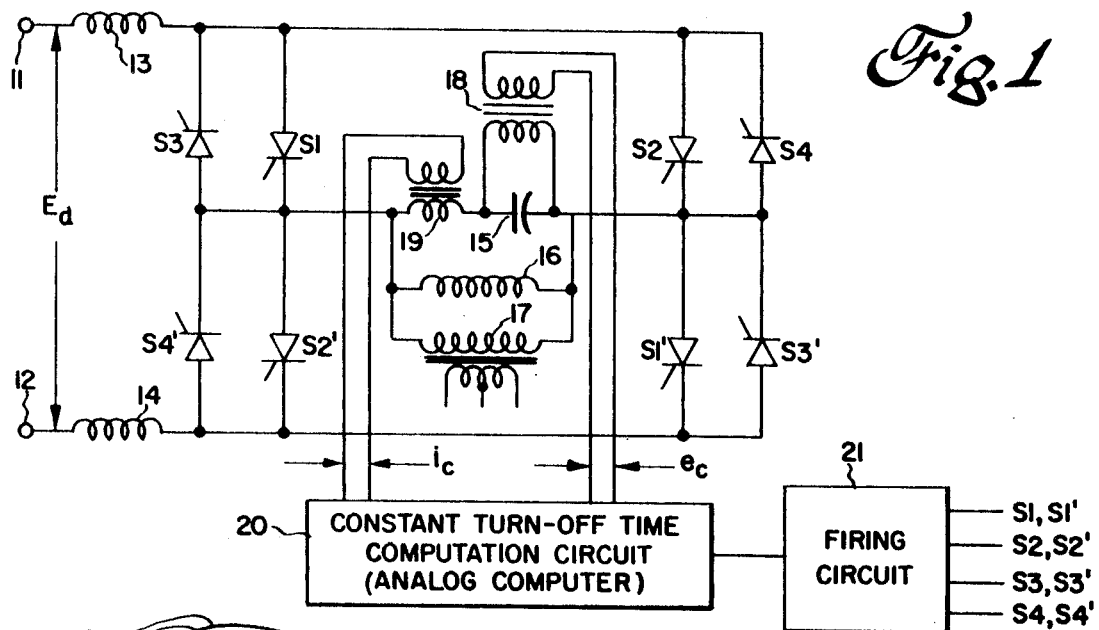
FIG. 1 is a schematic circuit diagram of a full bridge variable frequency converter including a constant turn-off time control circuit constructed in accordance with the invention to supply output signals to the firing circuit for the thyristor power devices.

The single phase, full bridge, solid state inverter shown in FIG. 1 has a tuned parallel resonant commutation circuit and, for this application, it typically operated at a variable, high frequency. The inverter has a pair of input terminals 11 and 12 between which is applied a relatively constant unidirectional voltage $E_d$ supplied by a battery or a rectifier and filter connected to an alternating current source. A pair of chokes or filter inductors 13 and 14 are respectively connected between the input terminals and the full bridge arrangement of a pair of series connected main thyristors S1 and S2′ and a parallel pair of series connected main thyristors S2 and S1′. The parallel resonant commutation circuit comprised by the parallel commutating capacitor 15 and commutating inductor 16 is connected between the junctions of the respective pairs of main thyristors. Thyristors S1 and S1′ conduct together, and commutation is initiated by firing S2 and S2′ in the alternate half cycles whereby the commutating capacitor voltage provides a reverse anode-cathode voltage for turning off the then conducting thyristors. Similarly, as in the ordinary parallel capacitor commutated inverter, commutation of the conducting thyristors S2 and S2' is initiated by turning on the other pair S1 and S1'. The primary winding of the load or coupling transformer 17 is connected in parallel with the capacitor 15 and inductor 16, and by way of example has a center-tapped secondary winding connected to a polyphase output cycloconverter for supplying variable frequency and voltage to a load. The inverter is ordinarily operated at a high frequency, about 1,000 to 4,000 Hz, and the operating frequency is usually above the resonant frequency of the commutation circuit. At resonance, the commutating capacitor and inductor would have equal but opposite reactive power so that none would be available for the load. At twice the resonant frequency, the capacitor power is doubled, while the inductor power is halved, so that three-quarters of the reactive power of the capacitor is available for correcting the lagging reactive power of the cycloconverter, and providing commutating energy and turn-off time for thyristors in the inverter and also in the cycloconverter. Theoretically, when the load has a leading power factor, the operating frequency drops below the resonant frequency of the commutation circuit. The feedback thyristors S3 and S3', respectively connected across the main thyristors S1 and S1', and the other pair of feedback thyristors S4 and S4', respectively connected across the main thyristors S2 and S2', are provided for regenerative loads and can be controlled under certain conditions to reduce and eliminate any circulating current. The feedback thyristors are necessary when the converter is to be operated directly from an a-c source in the fashion of a cycloconverter. The commutating inductance can be provided by the coupling transformer 17 by using an air core or gapped iron core to provide sufficient inductance in the primary circuit.

The control means and control method for controlling the converter with a parallel resonant commutation circuit employs sensing devices for obtaining appropriate data as to the instantaneous state of the power circuit in each half cycle, and a constant turn-off time computation circuit or analog computer for determining the time at which the next set of thyristors or other controlled power devices are to be rendered conductive. The basic objective is to provide constant circuit turn-off time for the controlled power devices. The method of control senses the present state of the power circuit and extrapolates to project the future state assuming that the next set of thyristors is to be fired at the present time. The incoming thyristors are actually fired when the time of capacitor voltage reversal, measured from the present instant, is predicted to equal the turn-off time of the outgoing thyristors plus some safety margin. Thus, the thyristors are fired at the last safe moment, thereby minimizing the reactive power required for commutation. The effect of the operation of the constant turn-off time control means is that the operating frequency is automatically adjusted so that the thyristor turn-off time remains constant. With no unnecessary reactive power the effeciency of the converter is optimum and the voltage on the power circuit components is minimized. Since the control means operates instantaneously in each half cycle, the response of the converter is fast so that wide fluctuations in the output voltage are avoided as well as thyristor commutation failure. Severe voltage transients due to a variety of causes are accommodated without causing failure of this circuit.

Figure 2:
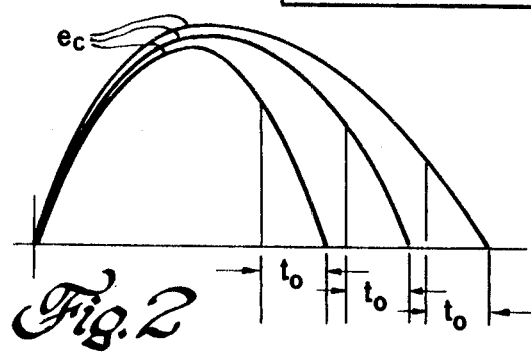
FIG. 2 illustrates schematically the commutating capacitor voltage waveforms under different load conditions and the operation of the constant turn-off this control technique to adjust the operating frequency.

The schematic commutating capacitor voltage waveforms for a half cycle of operation under different load conditions shown in FIG. 2 illustrates in a simplistic form the automatic adjustment of the operating frequency using the constant turn-off control technique. The waveform of the capacitor voltage $e_c$ at resonance is approximately but not exactly sinusoidal. Under heavy load conditions the commutating capacitor discharges more rapidly, while under lighter load conditions, the discharge time becomes longer and less commutating energy is required by the load and the converter. Under heavy, intermediate, and light load conditions, the turn-off time $t_o$ for the thyristors remains constant, although the magnitude of the capacitor voltage at which the next thyristor or set of thyristors is fired is higher for the heavy load situation and becomes progressively lower as the load decreases. The circuit turn-off time presented to the controlled power device being commutated terminates, of course, when the capacitor voltage passes through zero and its polarity reverses. At this point reverse voltage is not applied to the device being commutated and it must have regained its blocking ability by this time. In the case of a silicon controlled rectifier, the required turn-off time varies with things such as the junction temperature, the peak forward current, and the reverse voltage applied to the device. These are discussed for example in the General Electric SCR Manual, 5th Edition, (copyright 1972) pages 124–127. As there defined, the turn-off time referred to here is the circuit turn-off time, i.e., the turn-off time that the circuit presents to the SCr. In a particular power circuit using a particular device, the worst case is ordinarily used plus some safety margin, but this is a time, such as 10 microseconds, that can be readily determined.

Preferably, the sensing devices for continuously sensing appropriate parameters of the power circuit include a simple potentiala transformer having a primary winding connected across commutating capacitor 15 for obtaining the capacitor voltage signal $e_c$ and a simple current transformer 19 connected in series with the commutating capacitor 15 for obtaining a capacitor current $i_c$. In practice additional power currents are needed or another set of power currents is used as will be explained. The instantaneous capacitor voltage signal $e_c$ and the instantaneous capacitor current signal $i_c$ and/or other current signals are supplied as input data to the constant turn-off time computation circuit 20, which is in effect an analog computer. The output pulse or signal derived by computation circuit 20 is fed to a firing circuit 21 to generate the firing signals for rendering conductive the appropriate pair of thyristors as indicated. Firing or gating circuit 21 is a conventional circuit as described, for example, in the previously mentioned General Electric SCR Manual, and may be provided as an integral part of the constant turn-off time computation circuitry 20. Although other power circuit parameters may be sensed to effectively obtain the instantaneous capacitor voltage and current, it is preferred of course to measure these as directly as possible.

Figure 3:
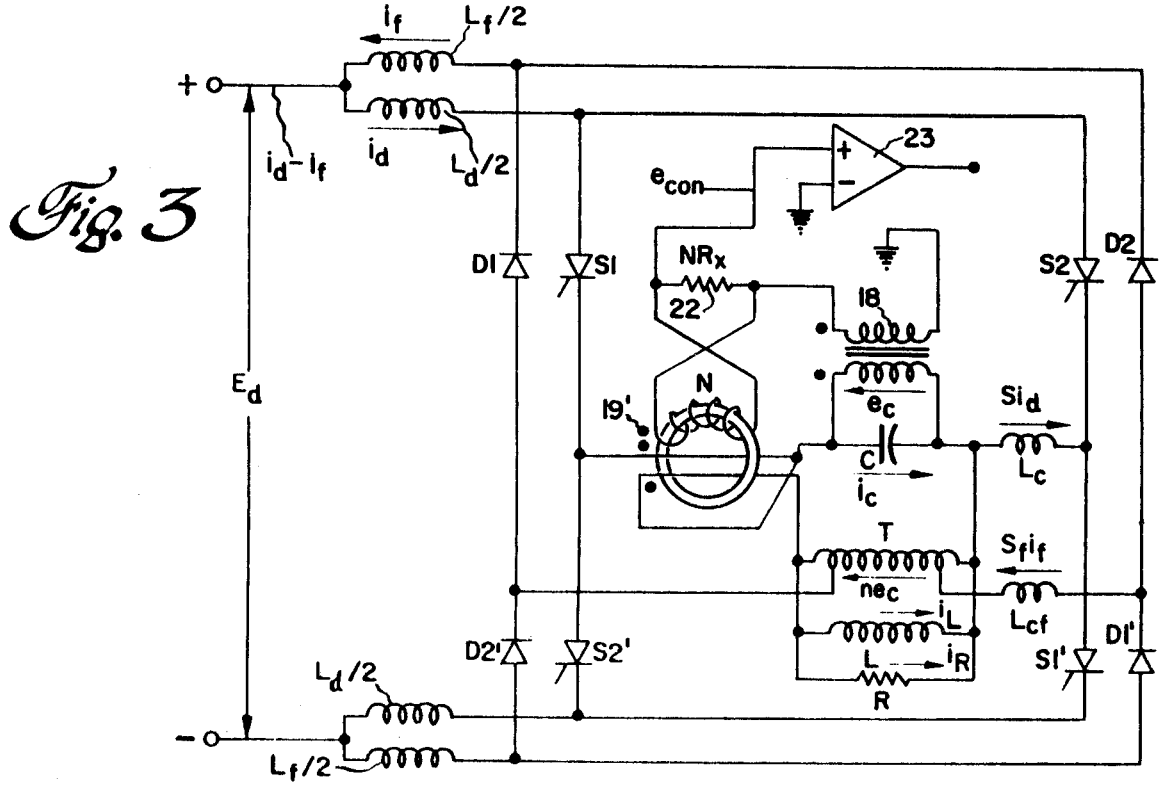
FIG. 3 is a detailed schematic circuit diagram of a preferred embodiment of the inverter power circuit and constant turn-off time computation circuit including the sensors for continuously sensing the commutating capacitor current and voltage and other required power currents.

A specific example of the practice of the invention is described in detail with reference to the single phase, full bridge inverter of FIG. 3, although it is understood that another inverter or converter circuit configuration may be more suitable for a particular appliIcation. The power circuit of the FIG. 3 inverter is similar to FIG. 1, with the exception that power feedback diodes D1, D1', D2, and D2' are substituted for the feedback thyristors in FIG. 1. The load for the inverter is the load resistance R connected in parallel with the resonant L-C commutation circuit. This power circuit can be used for high frequency induction heating with the difference that as the load changes it is desirable to provide unity power factor to the changed load by adjusting the operating frequency of the inverter to the new value of the resonant frequency. The power inverter of FIG. 3 can also be used as the input inverter of the high frequency link cycloinverter system. A mathematical analysis, using as a starting point the differential equation for the commutating capacitor voltage, is used in the derivation of the sensing device arrangement and construction of the analog computer, as well as the generation of the control signal $e_{con}$ used to indicate the time of firing of the next set of thyristors in order to obtain constant turn-off time. Therefore, the symbols used in the equations are shown in FIG. 3, rather than the usual numerical designation of the components. The feedback rectifier diodes are necessary when the load is regenerative, and they also prevent excessive buildup of voltage across the parallel resonant commutation circuit when the load is light and the discontinuous current mode of operation prevails. The input filter inductors are assumed to be uncoupled and each divided into a forward or direct filter inductor having a value $L_d/2$ and a current $i_d$, and a feedback filter inductor having a value $L_f/2$ and a current $i_f$. The supply current is then $i_d-i_f$. When the two parts of the forward filter inductor whose total value is $L_d$ is designed as a swinging choke, it may be possible to reduce the current where transistion between the continuous and discontinuous modes occurs to a sufficiently low level, e.g., the current to supply the no-load losses, such that the feedback diodes can be omitted for non-regenerative loads. The two pairs of series-connected feedback diodes are respectively coupled between the terminals of the feedback filter inductors, while the two pairs of series-connected main thyristors are coupled between the terminals of the forward filter inductors. An autotransformer T is connected in parallel with the L-C commutation circuit, where $n$ is the ratio of the number of turns between taps to the total number of turns, and the taps are respectively connected to the junction of the feedback diodes D1 and D2' and the junction of the feedback diodes D2 and D1'. The voltage between the taps consequently has the value $ne_c$ with the polarity as indicated. When the peak capacitor voltage rises too high above the d-c supply voltage, the feedback diodes become conductive and partially discharge the commutating capacitor. Under some conditions, as is known in the art, it is possible for all four feedback diodes to conduct, in which case the load voltage is clamped to zero. Preferably a small series current-limiting commutating inductor $L_c$ is provided to limit the $di/dt$ in the main thyristors, and is suitably connected between one terminal of the L-C commutation circuit and the junction of the thyristors S1 and S1'. Similarly, there is a series current-limiting feedback commutating inductor $L_{cf}$ coupled between the adjacent tap of the autotransformer T and the junction of feedback diodes D2 and D1'. If not provided as a separate component, this inductance is present because of the leakage reactance of the autotransformer T.

For this power converter configuration, the preferred arrangement of the sensing devices for the constant turn-off time control means is as illustrated. The small potential transformer 18 continuously senses the commutating capacitor voltage $e_c$, and a unity turns ratio is assumed with the polarity convention as shown by the dots. The current transformer 19' has two oneturn primary windings and a secondary winding of N turns, the polarity convention being as indicated by the dots. One of the primary turns senses $i_d$ and is connected directly between the junction of main thyristors S1 and S2' and the junction of the L-C commutating circuit components, while the other primary winding senses $ni_f + i_L + i_R$ and is connected in series between one terminal of the commutating capacitor C and the adjacent terminal of the commutating inductor L, autotransformer T, and load resistance R. The secondary winding is connected across a computation circuit burden resistor 22, also identified as $NR_x$, which in turn is connected in series with the secondary winding of the potential transformer 18. The control signal $e_{con}$ comprised by the addition of the voltage across burden resistor 22 and the voltage across the secondary winding of the potential transformer 18 is referenced to ground and compared with a zero voltage level using an integrated circuit comparator 23 or a differential amplifier. The constant turn-off time computation circuit can include other components, such as a delay circuit and inhibit circuit, as will be further explained. The generation of an output signal from the comparator 23 indicates that the next set of thyristors are to be fired, in order to obtain a constant turn-off time for the presently conducting devices. The reasons for the arrangement of the sensing devices and computation circuit as shown in FIG. 3 can only be explained by the following mathematical analysis, and the reason for firing the next set of thyristors when the control signal $e_{con}$ passes through zero is also a mathematically derived concept.

The development of the equation for the control signal $e_{con}$ which goes through a zero value in advance of the commutating capacitor instantaneous voltage zero at an interval equal to the constant turn-off time for commutation, uses a derivation that starts at a simplification and then proceeds to the actual power circuit without, and then with, the series current-limiting $L_c$ and $L_{cf}$ that usually are required in practice. These equations determine the sensing device and computation circuit configurations, which will be shown to have the basic form illustrated in FIG. 3. For the power circuit with the series current-limiting inductors, the value of the burden resistor $R_x$ is different than for the case of a power circuit without these components, but otherwise the constant turn-off time control means can be the same. Assuming negligible or zero $L_c$ and the proper polarity of the capacitor voltage $e_c$, the current $i_d$ commutates from thyristors S1 and S1' to thyristors S2 and S2' as soon as the latter pair is fired, and vice versa. Similarly, assuming zero $L_{cf}$, the feedback current $i_f$ commutates instantaneously from diodes D1 and D1' to diodes D2 and D2' when the capacitor voltage $e_c$ crosses zero going negative, and the former pair of diodes conduct when the capacitor voltage reverses again. The state of the power semiconductor devices can then be described by switching functions S and $S_f$ as follows:

S = + 1 when S1 and S1' are conducting
S = − 1 when S2 and S2' are conducting
$S_f$ = + 1 when D1 and D1' are conducting
$S_f$ = − 1 when D2 and D2' are conducting Unless a commutation failure or shoot-through occurs, the two states of S are mutually exclusive for instantaneous commutation ($L_c$ = O). The two states of $S_f$ are not necessarily mutually exclusive since it is possible for all four diodes to conduct under certain conditions. But, since the thyristors must be fired before the capacitor voltage reaches zero, and only one set of diodes can possibly be conducting when the capacitor voltage is not zero, the states of $S_f$ can be considered to be mutually exclusive at this time of interest.

Figure 4:
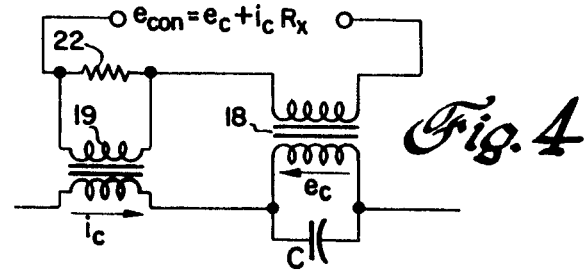
FIG. 4 is a schematic diagram of the preferred sensing devices and simplified computation circuit similar to that shown in FIG. 3.
Figure 5:
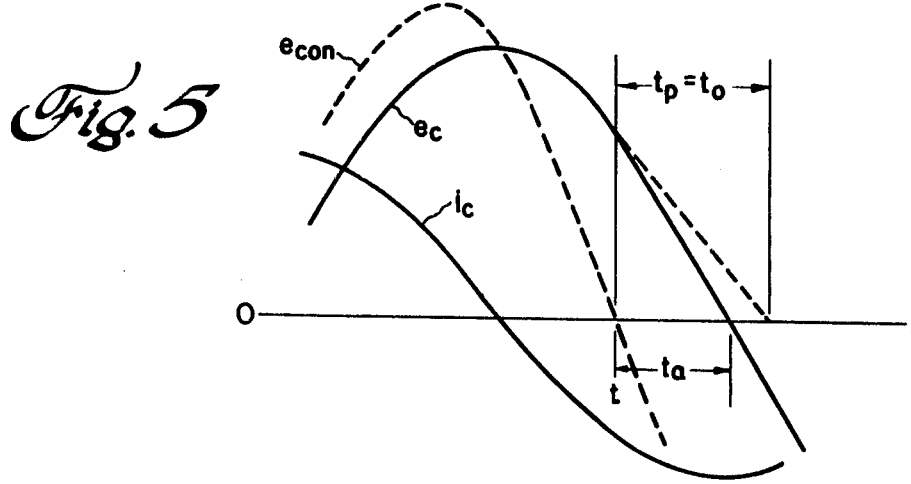
FIG. 5 is a waveform diagram of the commutating capacitor current and voltage and of the control signal, and is used in conjunction with FIG. 4 to explain the principles of the constant turn-off time computation circuit.

The control circuit, as was stated, senses the present state of the power circuit and extrapolates to predict the future state with the assumption that the next set of thyristors is fired at the present time. The method of prediction is similar to the numerical solution of the differential equation for the capacitor voltage by the simple Euler method. Euler's method, and also the second order Runge-Kutta method, are described for example in the book "Introduction to Numerical Methods and FORTRAN Programming" by T. R. McCalla, John Wiley and Sons, Inc., copyright 1967, pages 307–310. Euler's method is the simplest of all algorithms for solving ordinary differential equations. FIG. 4 is a simplified drawing of the sensing device and computation circuit or analog computer of FIG. 3. For this arrangement the numerical value of $e_{con}$ is $e_c + i_c R_x$, where the turns ratio of both the current and potential transformers is unity for simplicity. The circuit waveforms for $e_c$, $i_c$, and $e_{con}$ are shown in FIG. 5. The differential equation for the capacitor voltage $e_c$ is $$(de_c/dt) = (i_c/C). \quad (1)$$

By projecting the slope as given by equation (1) at the time instant $t$ (FIG. 5) to intersect the zero voltage axis, the predicted time $t_p$ remaining to voltage zero is given by $$t_p = -(Ce_c/i_c). \quad (2)$$

Rearranging (2), $$0 = e_c + (t_p/C)i_c. \quad (3)$$

From (3) it is seen that if the burden resistor $R_x$ is selected to have the value $R_x = t_o/C$, where $t_o$ is the turn-off time made available for the outgoing thyristors ($t_o = t_p$), then $$e_{con} = e_c + R_x i_c = e_c + (t_o/C)i_c, \quad (4)$$

and the zero-crossing of this signal is the instant when the incoming thyristors are to be fired so that $t_p = t_o$ is satisfied. The difference between $t_p$ and the actual time $t_a$ to voltage zero is the error inherent in the simple Euler method, and can be reduced by using a second-order method of numerical prediction that includes in the equations the derivative $di_c/dt$ of the capacitor current. Such an improvement is easily incorporated in practice by making the current transformer burden suitably reactive.

This simple approach is not usable in the present situation where the commutating capacitor and load are driven by the inverter, since the act of firing the incoming thyristors changes the capacitor current. It is important to note that in computing when to fire the incoming thyristors, it is the capacitor current after firing that is used in the equations. Denote the present state of the thyristor switching variable S by $S_1$. Then (see FIG. 3) the present capacitor current is $$i_c = S_1 i_d - (S_f n i_f + i_L + i_R). \quad (5)$$

By firing the incoming thyristors at this instant, the value of $S$ reverses and the capacitor current changes to $$i_c' = -(S_1 i_d + S_f n i_f + i_L + i_R). \quad (6)$$

The value of (6) must be used in equations (2) and (3) to calculate when the capacitor voltage reverses after the thyristors are fired. Thus, the control signal becomes $$e_{con} = e_c - R_x(S i_d + S_f n i_f + i_L + i_R). \quad (7)$$

Note that the change in capacitor current is in the direction that accelerates discharge after firing the incoming thyristors, so that the projection according to equation (2) would result in insufficient turn-off time. Since the contribution of the feedback current to capacitor discharge does not change until after $e_c$ has crossed zero, the present state of the switching function $S_f$ is correct for computing the firing time.

The control signal $e_{con}$ as defined by equation (7) is provided by the sensing device arrangement shown in FIG. 3. It is recalled that the potential transformer 18 has a unity turns ratio, while the current transformer 19' has two one-turn primary windings and an N turn secondary winding. For the half cycle in which $e_c > 0$, S2 and S2' are the incoming thyristors, and the circuit operation is illustrated by the waveforms in FIG. 6. Because $L_c$ and $L_{cf}$ have been assumed to be zero, the negative-going capacitor current $i_c$ at the firing time $t$ drops by twice the absolute value of the direct (thyristor) current $i_d$, remains approximately constant during the actual turn-off time $t_a$, and then rises by twice the absolute value of the feedback current $i_f$ after blocking of the outgoing thyristors is achieved. The control signal $e_{con}$ passes through zero (see A) at the firing time $t$, then goes positive again, and passes through another zero at B before becoming negative. The second zero-crossing B is a spurious crossing. This and any other spurious zero-crossing is ignored, as by using the modifications and additions to the computation circuitry shown in FIG. 8. Using the comparator 23 in FIG. 3, the signal $e_{con}$ is compared with a zero reference voltage level, and the generation of an output signal at time $t(=A)$ causes the firing circuit (FIG. 1) to supply firing or gating signals to the appropriate set of thyristors. The turn-off time $t_o$ is approximately equal to $t_a$ in FIG. 6.

The inclusion of the small series current-limiting commutating inductors $L_c$ and $L_{cf}$ to limit the $di/dt$ in the thyristors modifies the commutation process and allows an overlap interval $t_u$ in which all four thyristors conduct. Instead of having an almost instantaneous change as in FIG. 6, the current $I_d$ transfers from the outgoing to the incoming thyristors at a rate $di/dt = e_c/L_c$ (see bottom of FIG. 7). Thus in FIG. 7 the drop in the current $i_c$ equals to twice the magnitude of the current during the overlap interval, $I_d$, takes place over the entire overlap interval $t_u$. Since reverse voltage is not applied to the outgoing devices until the completion of the transfer process, the firing of the incoming devices is advanced to allow for the time $t_u$ in addition to the turn-off time $t_o$ before the capacitor voltage reverses. It is demonstrated with regard to equations (8) to (b 17) of the previously mentioned application Ser. No. 416,006, which are omitted herein, that it can be shown by mathematical analysis that compensation for overlap due to the inclusion of $L_c$ and $L_{cf}$ is easily accomplished by increasing the value of the current transformer burden resistor $R_x$. With overlap compensation the control signal becomes $$e_{con} = e_c - (t_o/C)\sqrt{1 + (CL_c^2/t_o^2)}\,(Si_d + S_fni_f + i_L + i_R)$$
$$= 0 \text{ at time of firing.}$$
(18)

It is seen that the proper value of the burden resistor $R_x$ to include allowance for overlap is $$R_x = (t_o/C)\sqrt{1 + (CL_c^2/t_o)}$$
(19)

Figure 6:
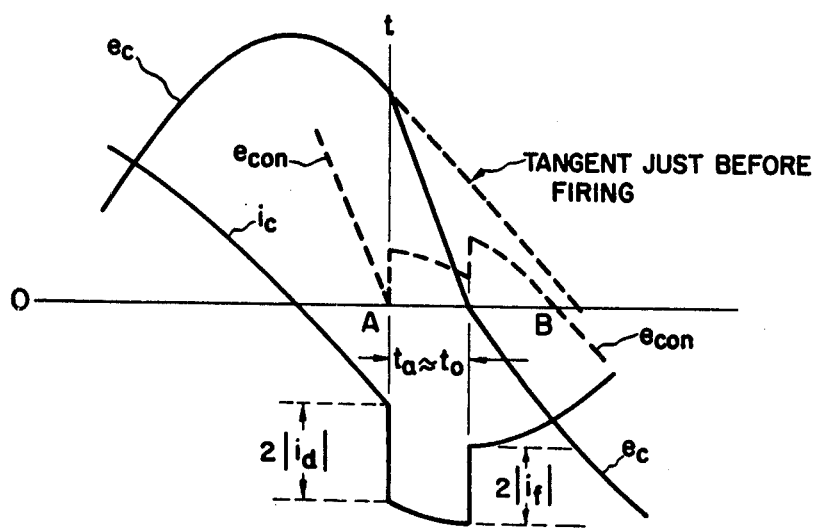
FIG. 6 is a waveform diagram similar to FIG. 5 and is used to explain the actual technique for computing capacitor voltage zeros for the power and control circuit of FIG. 3, assuming that the series commutating inductors $L_c$ and $L_{cf}$ are not present (although normally these are required)
Figure 7:
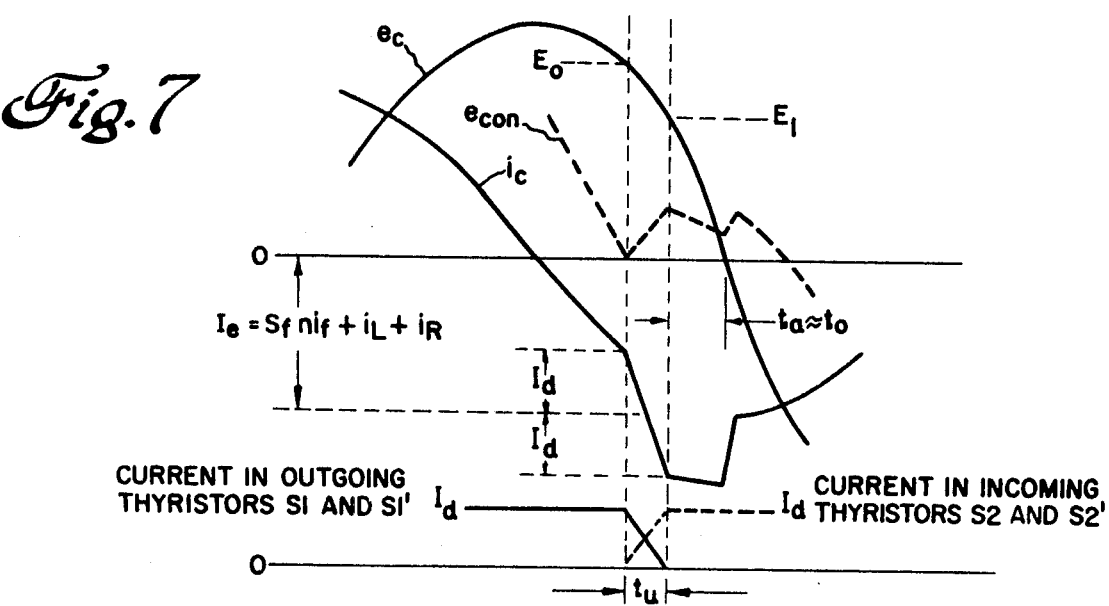
FIG. 7 is a waveform diagram similar to FIG. 6 for the power circuit with the series inductors $L_c$ and $L_{cf}$ to limit $di/dt$ during commutation so that there is an overlap in conduction of the set of thyristors.
Figure 8:
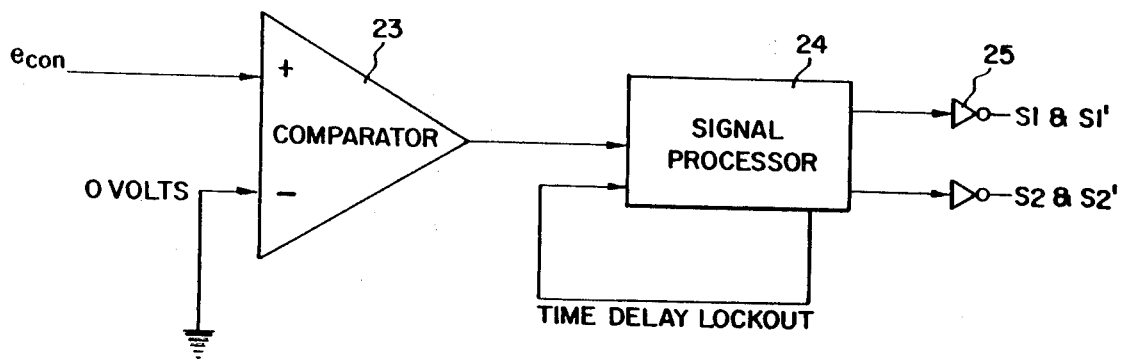
FIG. 8 is a simplified block diagram illustrating the additions to the computation circuit as shown in FIG. 3 to block the production of spurious output signals due to multiple zero-crossings of the control signal.

As was previously mentioned and as is evident in FIGS. 6 and 7, the control signal $e_{con}$ has spurious zero-crossings or near zero-crossings closely following the initial zero-crossing that is the valid output signal. Accordingly, additional circuitry at the output of the comparator 23, to effectively inhibit the comparator for a short interval following recognition of the first zero-crossing, is needed in a practical control circuit. This is illustrated in block diagram form in FIG. 8, wherein the signal processor 24 is provided with a time delay lockout feature that is activated by the first output pulse from the comparator. For instance, the signal processor can include a pair of one-shot multivibrators with logic to actuate the one-shots alternately. By making the output pulse duration of the one shots at least equal to the selected lockout delay time, the desired result is achieved. The gate driver amplifiers 25 energized alternatey by the signal processor 24 can produce a series of closely spaced firing pulses for thyristors S1 and S1' and the thyristors S2 and S2', as is sometimes needed for regenerative loads.

To start the inverter, the load should be minimized, and in fact it is believed that there is some load beyond which starting, if it is accomplished at all, requires auxiliary starting components or a special procedure. When the load is an output cycloconverter, the cycloconverter thyristors are temporarily blocked to unload the inverter. After raising the d-c voltage with the inverter thyristors nonconductive, a single firing pulse applied to one set of thyristors initiates oscillation of the parallel resonant commutation circuit. Subsequent firing of the thyristors is then controlled as herein taught.

The constant turn-off time computation circuit and control technique using first-order Euler method equations gives an accurate approximation of the precise or actual turn-off time. By way of verification, the turn-off time calculated according to a fourth-order Runge-Kutta method is close to the predicted turn-off time according to the first-order Euler method. Using the new control method, errors arise only if the load current changes significantly during the thyristor turn-off time, typically an interval of 10-100 microseconds that occupies a small fraction of each cycle. Accordingly, the safety factor can be small and the best possible performance is achieved at all frequencies. In an actual circuit, the turn-off time that is maintained is not exactly constant but can easily vary by 30 percent, for example, although in absolute time this can be only a few microseconds or tens of microseconds. As compared to the total length of the half cycle of the output voltage, the turn-off time provided as here disclosed is relatively constant.

Other configurations of the sensing devices, in particular the potential and current transformers, are possible. The bridge inverter shown in FIG. 9 is similar to that of FIG. 3 except that the feedback diodes and associated circuitry are omitted. For some loads the use of the feedback diodes is not essential. An alternative expression for the control signal as set forth in equation (7), obtained by algebraic manipulation, is as follows:

$$e_{con} = e_c + R_x(i_c - 2Si_d)$$
(7a)

To implement this computation the potential transformer is the same, but the current transformer 19'' now has a one-turn primary winding for the capacitor current $i_c$ and a two-turn primary winding for the direct current or thyristor current $i_d$. This same arrangement can be used for the power circuit with feedback diodes and an autotransformer. Still other equivalent computations are possible, all using a potential transformer and one or more current transformers as the sensing devices.

Cycloconverter Control

The constant turn-off control technique for an inverter in accordance with the foregoing analysis has general applicability to the case where the inverter drives a phase controlled converter or cycloconverter load, such as in the high frequency link cycloinverter sytstem shown in FIG. 10, but must be modified or extended to make allowance for the change in load current seen by the inverter when an output converter power device switches at the same time. This change in load current has a polarity to accelerate discharge of the commutating capacitor. In the absence of a change in load current, as may occur when the cycloconverter devices are fired earlier than the firing angle retard limit, the limit can be as previously described for converters without the modification to be now explained.

In controlling a cycloconverter or other type of phase-controlled converter, firing angle advance and retard limits must be established in addition to the usual firing circuit for rendering conductive the converter power devices at an adjustable angle within these limits. The manner in which the firing angle is modulated depends of course on the output waveform to be obtained. The firing angle advance limit is at the commutating capacitor voltage zero crossing or shortly thereafter and can be obtained from the potential transformer 18. By way of definition, the advance limit is utilized in the rectifying mode of operation and usually is determined by the earliest point at which the anode voltage first becomes positive. On the other hand, the firing angle retard limit is utilized in the inverting mode of operation and is the last safe moment, with allowance for a safety margin, at which an incoming power device can be fired so as to allow time for an outgoing power device to be turned off and fully recovered to withstand forward voltage. Before discussing this further, the construction and operation of the cycloinverter system in FIG. 10 will be reviewed only briefly in view of the more detailed explanation in Bedford U.S. Pat. No. 3,742,336. The technique for generating a firing angle retard limit signal can also be used with an inverter-phase controlled rectifier system with an L-C commutating circuit as shown in FIG. 4 of the Bedford patent. The output phase controlled rectifier normally supplies unidirectional load voltage, however the phase controlled rectifier is operative in inverter mode when the d-c voltage reverses direction, and in this case the firing angle retard limits becomes necessary.

In FIG. 10, the control inverter with a parallel resonant commutation circuit drives a three-phase delta-connected output cycloconverter and supplies adjustable frequency and voltage to a polyphase load such as an a-c induction motor. The inverter of FIG. 3 is preferably used with the modification with the resistance load R is replaced by a coupling transformer 17 of the type illustrated in FIG. 1. Although the transformer has a single primary winding 17p, there are three center-tapped secondary windings 17a', 17b', and 17c', one in each of the single phase output cycloconverter circuits 30a', 30b', and 30c', the center taps being respectively connected to the output terminals 31, 32, and 33. In the first single phase output cycloconverter 30a', the ends of coupling transformer secondary winding 17a' are respectively coupled to load terminals 32 through a first pair of inverse-parallel connected thyristors A'1 and A'2 and a second pair of inverse-parallel thyristors A'3 and A'4. A series filter inductor 34a' is provided as well as a shunt filter capacitor 35a' connected directly between load terminals 31 and 32. To sense the instantaneous single phase cycloconverter current $i_A$, a small center-tapped current transformer 36a' having a burden resistor 37a' is suitably connected in the power circuit such that the primary winding is between corresponding terminals of the two pairs of thyristors while the center tap is coupled through filter inductor 34a' to load terminal 32. This current transformer connection gives the cycloconverter current polarity with respect to the supply rather than the load. The other single phase cycloconverters 30b' and 30c' are identical in construction with corresponding components designated by similar letters and numerals for the B and C phases. The instantaneous single phase cycloconverter currents $i_B$ and $i_C$ are sensed by the respective current transformers 36b' and 36c'. In operation, the thyristors of each cycloconverter output circuit are phase controlled with respect to the higher inverter frequency to supply the desired voltage and current at the desired frequency to the load 38. Using cycloconverter 30a' as an example, thyristor A'1 or thyristor A'4 is fired for output current flow in the direction from terminal 31 toward terminal 32, the particular thyristor that is selected being dependent upon whether the voltage is to aid or oppose the current, and in similar fashion thyristors A'2 or A'3 are fired to produce output current flow in the other direction, the particular thyristor that is selected being dependent upoon the desired polarity of the voltages pulse. By controlling the three single phase output cycloconverters independently of one another at a high frequency rate established by the control inverter, the desired polyphase output waveform is produced at the load terminals. Power flow is also possible in the reverse direction, as when a regenerating load returns power to the source, in which case the cycloconverter thyristors operate in inverter fashion with respect to the normal load circuit. Referring to cycloconverter 30a' instance, thyristors A'2 and A'3 are fired alternately when the load voltage at line A' has a positive polarity, and the other two thyristors are used for negative polarity load voltage. Commutation energy for the cycloconverter thyristors is supplied by commutating capacitor 15 through coupling transformer 17. In the inverter of FIG. 3 there is a path through the feedback diodes for return of current to the source.

In the usual operation of the output cyloconverter, the firing angles of the cycloconverter thyristors are modulated to produce a three-phase sinusoidal or other desired output waveform. The firing angle retard limit is utilized and is of importance when the load cycloconverter is regenerating, or inverting, and the commutating capacitor must provide sufficient time to turn off the cycloconverter thyristors as well as the input inverter thyristors. The inverting mode operation of the cycloconverter occurs not only when a regenerative load is returning power to the source, but may also occur during certain periods when power is being fed from the source to an inductive or other appropriate power factor load. Since the firing of a cycloconverter thyristor causes a change in the load current seen by the inverter, and this change in load current has a polarity to accelerate discharge of the commutating capacitor, the firing angle retard limit must be in advance of the time defined by the passing through zero of the control signal according to equations (18) and (19). This will in effect allow additional time for the turn-off of a cycloconverter thyristor and assure that the switching of the load cycloconverter current has occurred before commencing the timing for turn-off of the inverter thyristors according to equations (18) and (19). That is, instead of using the present value $i_R$ of the load current, the future value $i_R$ after firing the incoming cycloconverter thyristor should be used. In regard to this discussion, for further information on cycloconverters and firing angle retard limits, reference may be made to the book by the inventor entitled "The Theory and Design of Cycloconverters," MIT press, Cambridge, Mass., copyright 1972.

In deriving the expression for the control signal suitable for generating a firing angle retard limit signal, the assumption is made that only one phase of the multiphase output cycloconverter is required to fire at its retard limit at any given time. This is true for sine-wave modulation, but may not be true for flat-topped overmodulation, which causes the firing angle to be fully advanced or fully retarded for a greater portion of each cycle. Consequently, there need be considered only the simultaneous or substantially simultaneous commutation of the inverter and one phase of the output cycloconverter. It is further assumed that the series commutating inductance for each phase of the cycloconverter has the same value $L_c$ as in the inverter, and that the turn-off time of the thyristors is the same. The series commutating inductance in the output converters is provided by the leakage reactance of the transformer secondary windings $17a'$, $17b'$, and $17c'$, and when different from $L_c$ requires only that the value of the burden resistors $37a'$, $37b'$, and $37c'$ be changed to agree. For simplicity it is assumed to be the same.

Let $i_{RO}$ be the inverter load current delivered to the cycloconverter phases that do not switch at their retard limit and $i_{RS}$ be the current delivered to the phase (for example, phase A) that does switch at its retard limit. The present load current of the inverter is $$i_R = i_{RO} + i_{RS} \quad (20)$$

Figure 11:
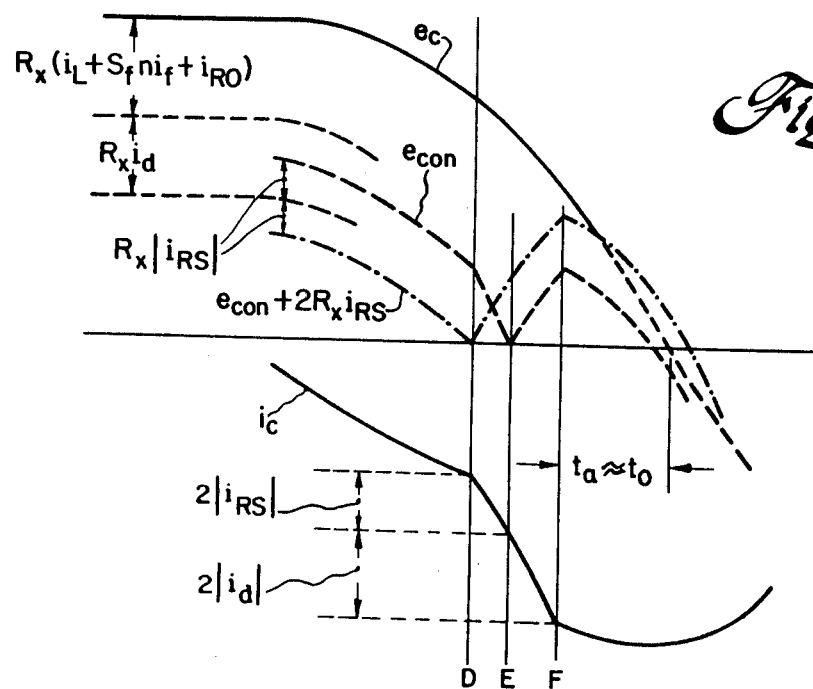
FIG. 11 is a waveform diagram, for the cycloinverter of FIG. 10, of the commutating capacitor current and voltage and of the control signals for the input inverter and the output cycloconverter firing angle retard limit signals.

The subscript $R$ no longer denotes a resistive load, but any load. The condition for firing the next set of thyristors in both the inverter and the switching phase is $$e_c - R_x(Si_d + S_f ni_f + i_L + i_{RO} - i_{RS}) = 0 \quad (21)$$

in place of (18), since $i_{RS}$ reverses after firing. For the positive half cycle of $e_{con}$ depicted in FIG. 11, the current $i_{RS}$ switches from a negative to a positive value. From equations (20) and (21), $$e_c - R_x(Si_d + S_f ni_f + i_L + i_R) + 2R_x i_{RS} = 0 \quad (22)$$

and $$e_{con} + 2R_x i_{RS} = 0, \quad (23)$$

where $e_{con}$ is the same as in equation (18) and is derived from the present total load current. In view of the detailed description of the previous waveform diagrams, it is believed that further explanation of FIG. 11 is not needed. The retard limit control signal $e_{con} + 2R_s i_{RS}$ derived for phase A can also be expressed as $e_{con} + 2R_x i_A$, where $i_A$ is the instantaneous cycloconverter current in that phase and is sensed by the center-tapped current transformer $36a'$ in FIG. 10. The retard limit control signal, of course, has an initial zero-crossing in advance of the inverter control signal $e_{con}$ sufficient to allow for commutation of the current from the outgoing cycloconverter thyristor to the fired incoming thyristor at the other side of the coupling transformer secondary winding.

Figure 12:
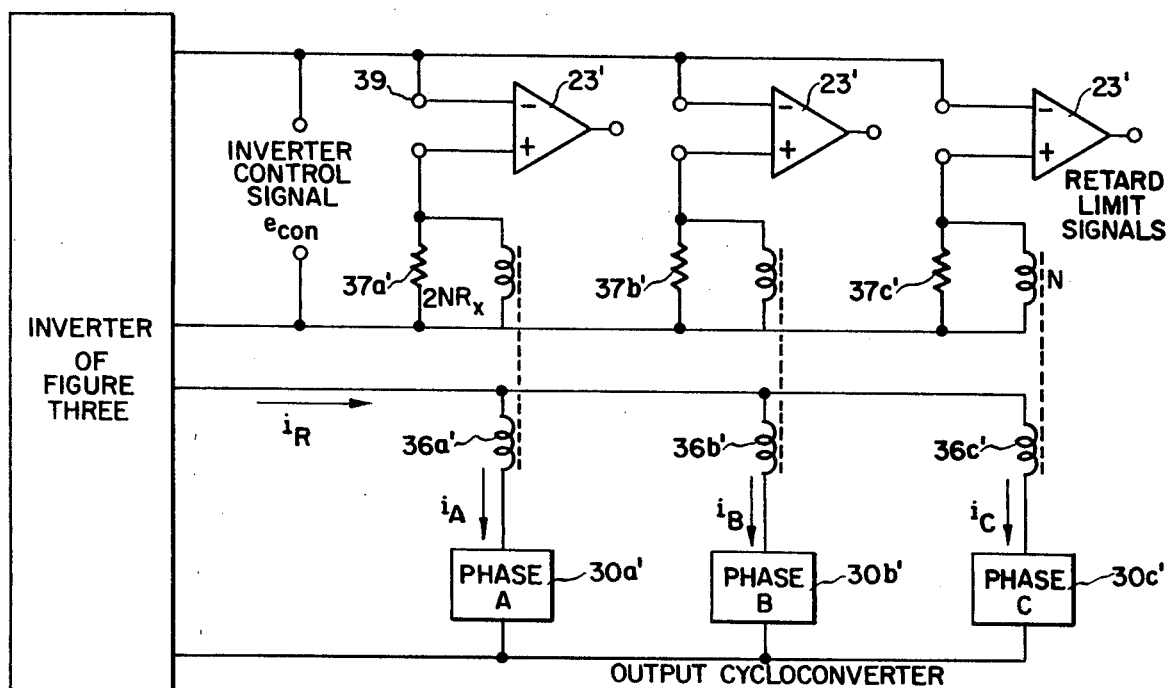
FIG. 12 is a block diagram of the high frequency link cycloinverter system and of the additions to the constant turn-off time computation circuitry, beyond that shown in FIG. 3, to obtain the firing angle retard limit signals.

The additions to the computation circuitry, over and above that illustrated in FIG. 3 or FIG. 9 to generate the inverter control signal $e_{con}$, for obtaining independent retard limit signals for all the cycloconverter phases are shown in diagrammatic form in FIG. 12. The three current transformers $36a'$, $36b'$, and $36c'$ for the single phase cycloconverter currents have a secondary windings each with $N$ turns and an associated burden resistor with a value $2NR_x$. For each phase, the respective burden resistor and terminals 39 for the phase retard limit control signal are connected across the terminals for the inverter control signal $e_{con}$. The zero-crossing of each cyclically varying retard limit control signal is obtained in the same manner as the zero-crossing of the inverter control signal, by comparison with a zero volts reference using a comparator $23'$. Also, spurious zero-crossings are inhibited in the same manner using a time delay lockout (see FIG. 13). With this arrangement, three separate firing angle retard limit signals are generated for each of the output cycloconverter phases. These are supplied to the usual cycloconverter firing circuit and cause a gating signal to be produced in the event the normal operation of the firing circuit has not already fired the appropriate thyristor. Referring again to FIG. 11, the switching phase of the cycloconverter is fired in response to the output signal of the comparator circuit $23'$ that solves equation (23) at time $D$. Then the current $i_{RS}$ reverses and the condition $e_{con} = 0$ solved by the inverter comparator 23 is satisfied as soon as cummutation of the cycloconverter thyristor is completed at time $E$. The interval $D$ to $E$ is the overlap period of the cycloconverter. The inverter thyristors are now fired and commutation of the outgoing inverter thyristors takes place over the interval $E$ to $F$. The recovery interval $t_a$ during which reverse voltage is applied to an outgoing device in the inverter, and also in the cycloconverter, extends from time $F$ to the capacitor voltage zero and is approximately equal to $t_o$, the turn-off time. It will be recognized that the interval $D$ to $E$ is quite short, and reduces to zero when there is no series inductance $L_c$, and it can be said that the commutation of the cycloconverter and inverter thyristors is substantially simultaneous.

Figure 13:
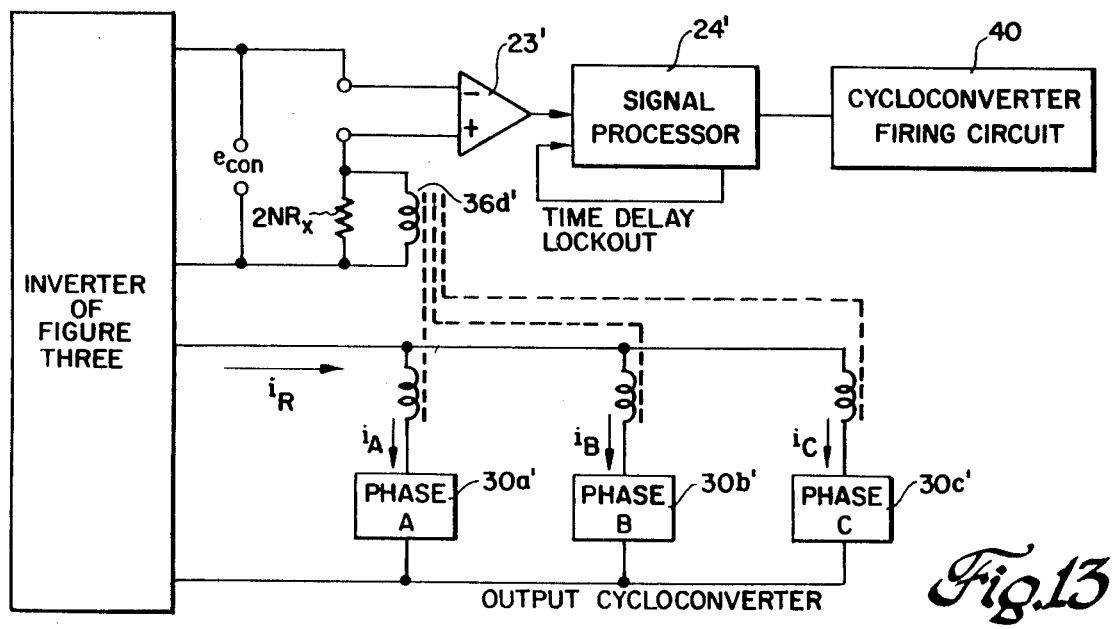
FIG. 13 is a modification of FIG. 12 using a simplified arrangement to obtain a single firing angle retard limit signal for all the phases.

As a control ciruit simplification, and to allow overmodulation when two or more cycloconverter phases switch at their retard limits, a single conservative retard limit signal can be generated for all three phases of the output cycloconverter. The total load current $i_R = i_A + i_B + i_C$ is used in place of $i_{RS}$ in equation (23). This allows more time for the cycloconverter thyristor commutation (i.e., the time interval $D$ to $E$ is longer) and is a conservative retard limit under normal conditions. In FIG. 13, the change in the current sensor is made that the three current transformer primary windings are wound on a single core having only one secondary winding. Otherwise the connection of the current transformer $36d'$ is the same. This figure illustrates the signal processor $24'$ with a time delay lockout feature to inhibit spurious zero-crossings, and a cycloconverter firing circuit 40.

Figure 14:
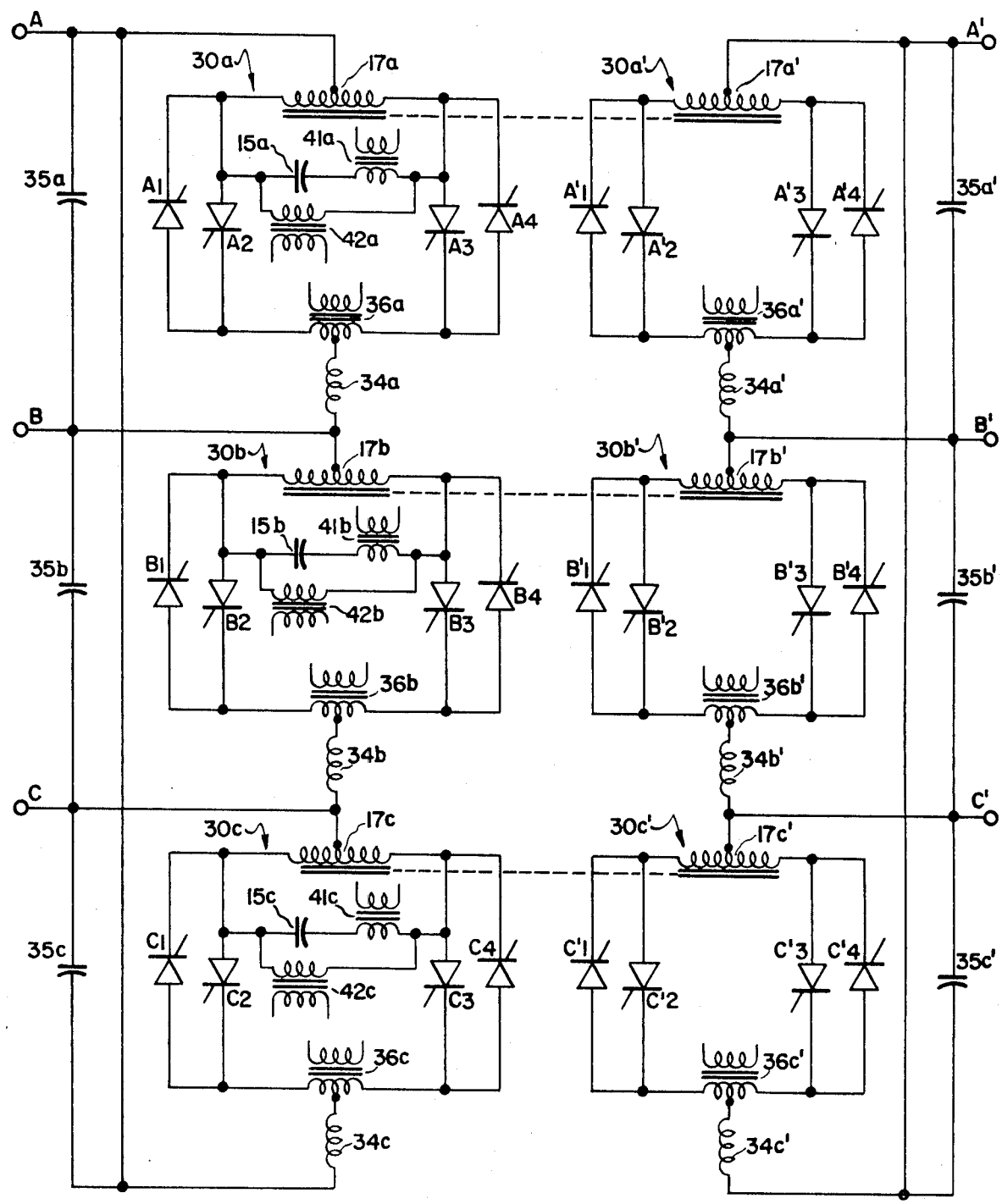
FIG. 14 is a detailed circuit diagram of one form of a high frequency link cycloconverter system to which the invention is applicable, in which both the input and output cycloconverter are delta-connected.
Figure 15:
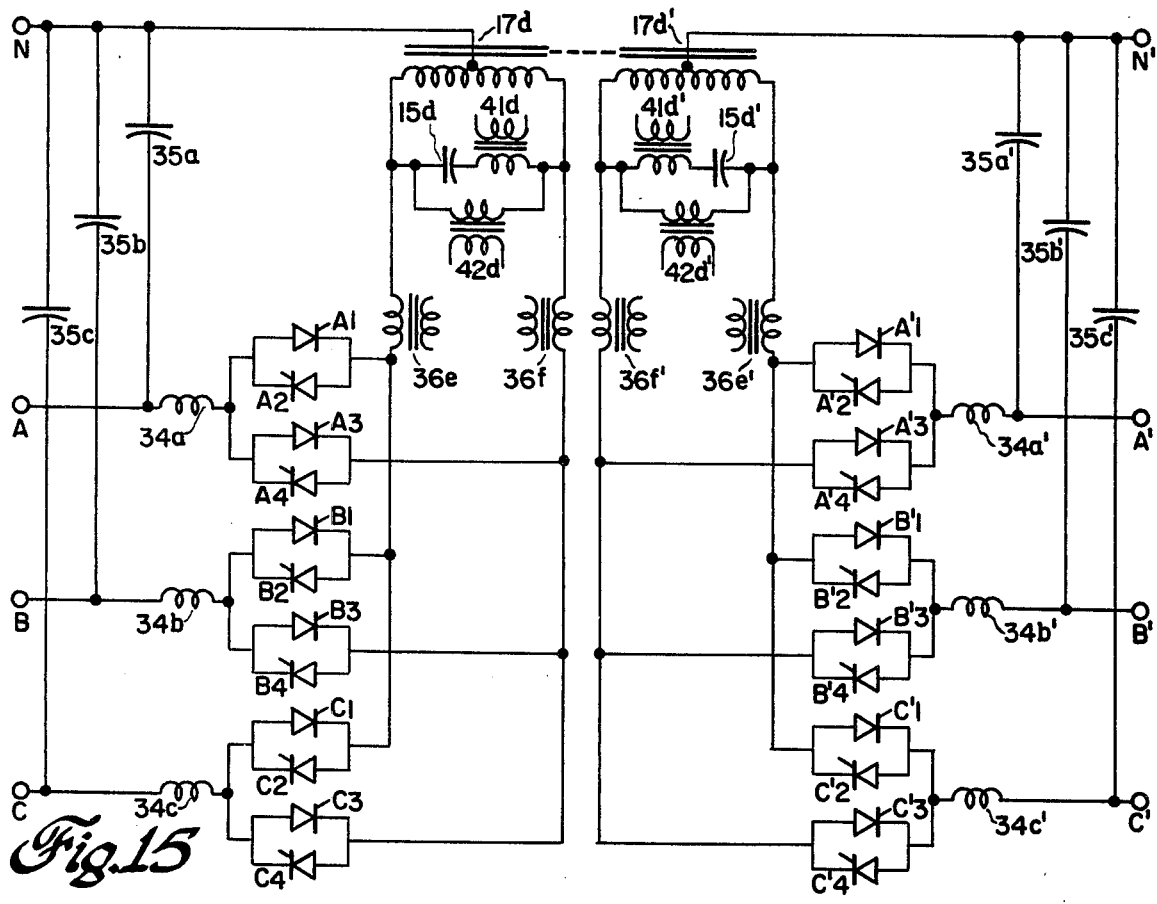
FIG. 15 is similar to FIG. 14 and shows a high frequency link cycloconverter system with wye-connected input and output cycloconverters.

The embodiment of the high frequency link cycloconverter system shown in FIGS. 14 and 15 are constructed with a pair of cascaded cycloconverters having an intermediate l-C circuit for commutation. When supplying power to the load, an input regenerating cycloconverter operates the tuned high frequency commutation circuit directly from a polyphase a-c supply. It will be shown that the firing angle retard limits for both the input and output cycloconverters are obtained in a similar manner. In contrast with the high frequency link cycloinverter system, the input and output cycloconverters are not driven to their retard limits at the same time, so that it is not necessary to allow for simultaneous firing of thyristors in the input and output converters near the retard limit.

The delta-connected and wye-connected cycloconverter systems of FIGS. 14 and 15 are specific illustrations of the full wave converters disclosed in the previously mentioned U.S. Pat. No. 3,742,336 at column 12, lines 49–62, and the invention is also applicable in principle to the half wave converters shown in FIGS. 7 and 8 of the patent. In the delta-connected version, the output circuit comprised by the three single phase cycloconverters 30a', 30b' and 30c' is identical to the output circuit in FIG. 10. The input circuit is comprised by the three similar single phase-to-single phase cycloconverters 30a, 30b, and 30c, in which corresponding components are designated by corresponding unprimed numerals. Although a single commutating capacitor can be provided, in this circuit there are three parallel-connected commutating capacitors 15a, 15b, and 15c each respectively connected across the coupling transformer center-tapped primary winding 17a, 17b, or 17c. The coupling transformers are combined reactor-transformers that supply the parallel commutating inductance as well as some series current limiting inductance on each side. On the input side, the three center-tapped current transformers 36a, 36 b, and 36c continuously sense the individual instantaneous cycloconverter currents which can be summed or totalized to obtain the total cycloconverter current. The same sensing device arrangement appears on the output side. In addition, the capacitor current transformers 41a–41c and the capacitor potential transformers 42a–42c are provided in the input converter. Typically, for application as a variable speed a-c motor drive, power is supplied to lines A, B, and C from a three phase, 60 Hz, 230 volt supply, the high frequency link is operated at about 2–4 kHz, and the adjustable voltage three phase output has a variable frequency between 0–300 Hz.

In the usual mode of operation in which power flow is in the direction from the source to the load, each phase of the input converter operates as an inverter and drives the sectionalized parallel resonant commutation circuit. In phase A for example, when line A is positive with respect to line B the operating frequency is established by alternately rendering conductive thyristors A2 and A3, and the oppositely poled pair of thyristors are used when line B is positive with respect to line A. With a center-tapped primary winding in the coupling transformer, it is seen that with thyristor A2 conducting, by way of illustration, the right hand capacitor plate charges to twice the supply voltage which is applied as reverse voltage to the device when thyristor A3 is turned on. The three input cycloconverters are coordinated so that with respect to the load converter there is effectively a single combined parallel resonant commutation circuit. The output converter is controlled in conventional manner as a polyphase cycloconverter. The inverter voltage is supplied through the coupling transformers and can be said to provide an artificial line for commutation of the output converter thyristors. At the firing angle retard limit, an incoming device is turned on in advance of the commutating capacitor voltage zero so as to allow constant turn-off time for an outgoing device, which must be commutated off and fully recovered to withstand forward voltage by the time the capacitor voltage applied to it through the coupling transformer passes through zero. Firing angle retard limits for the input and output converters are produced as discussed in regard to FIG. 16. A modulated phase control operates the input converter, and the retard limit control signal is used to fire a thyristor in the input converter only when this control is driven to its retard limit. Power flow in the reverse direction from the load to the source is also possible, and in this case the output cycloconverters 30a', 30b', and 30c' function in inverter fashion while the input cycloconverters 30a, 30b, and 30c operate in rectifier mode to return power to the supply.

The three phase, wye-connected high frequency link cycloconverter system of FIG. 15 utilizes a single combined reactor-coupling transformer having center-tapped primary and secondary windings 17d and 17d' across each of which is connected the respective commutating capacitors 15d and 15d'. In each of the input and output single phase cycloconverters, wherein corresponding components are identified by the same numerals as in FIG. 14, one pair of inverse-parallel thyristors in each phase is connected to one junction of the parallel L-C circuit, while the other pair of thyristors is connected to the other junction. The neutral terminals N and N' are coupled to the centertaps of the coupling transformer windings as well as to one plate of the several filter capacitors 35a, 35a', etc. The operation of the wye-connected and delta-connected cycloconverter systems is similar and no further explanation is believed to be necessary. To provide sensory information for the firing angle retard limit computation circuitry, the input converter is provided with a small current transformer 41d for the capacitor current, a potential transformer 42d for the capacitor voltage, and a pair of current transformers 36e and 36f connected between the respective junctions of the parallel L-C circuit and the pairs of thyristors in each phase to sense the components of the instantaneous cycloconverter input current. The input current components are summed as described later. On the output side another set of sensing devices is provided and designated by corresponding primed numerals.

Figure 16:
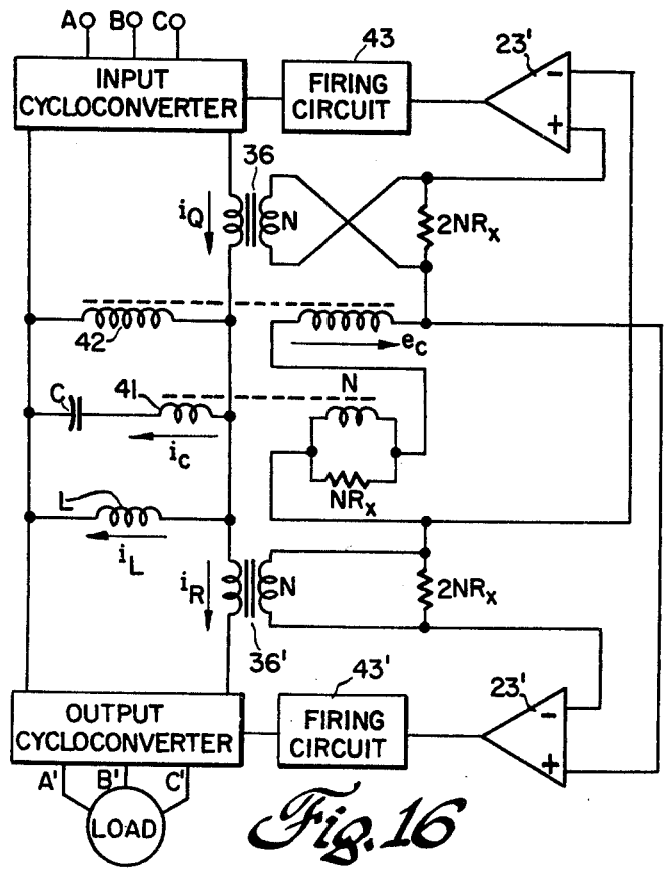
FIG. 16 is a schematic block diagram of a high frequency link cycloconverter system and of the sensing devices and constant turn-off time computation circuitry for deriving firing angle retard limit signals for the input and output cycloconverters.

The dual cycloconverter system with a high frequency link is shown in block diagram form in FIG. 16 together with a diagrammatic illustration of the sensing devices and computation circuitry for generating the retard limit signals for the input and output converters. The input converter has a total current $i_Q$, the output converter has a total current $i_R$, and the net present capacitor current is then $$i_c = i_Q - i_L - i_R .$$

(24)

For the input cycloconverter, the condition for the retard limit is $$e_c + R_x(i_c - 2i_Q) = 0.$$

(25)

For the output cycloconverter, the condition for the retard limit is $$e_c + R_x(i_c + 2i_R) = 0.$$

(26)

The change in sign in equations (25) and (26) merely indicates a change in direction of the current. It will be noted that the firing angle retard limit criteria is the same as the constant turn-off time criteria for the inverter of FIG. 9 as given in equation (7a).

The current transformer 36 in FIG. 16 senses the total input cycloconverter current $i_Q$ and is assumed to have a 1:N turns ratio and a burden resistor with a reversed polarity and a value $2NR_x$. The total capacitor voltage is sensed by potential transformer 42 with a 1:1 turns ratio, and the total capacitor current $i_c$ by current transformer 41 with a 1:$N$ turns ratio and a burden resistor with a value $NR_x$. The resulting signals are summed and generate a cyclically varying input converter retard limit control signal. In similar fashion, current transformer 36' senses the total output cycloconverter current $i_R$ and is assumed to have a 1:$N$ turns ratio and a burden resistor with a valve $2NR_x$. The output converter retard limit control signal is generated in accordance with equation (26). Both control signals are compared with a zero reference voltage, an output signal is produced at the zero-crossing, spurious zero-crossings are inhibited for a predetermined interval thereafter, and the retard limit output signals are fed to the respective firing circuits 43 and 43' for the input and output cycloconverters. When the appropriate set of thyristors has not already been fired due to normal operation of the firing circuits, the retard limit output actuates the generation of a thyristor gating signal. Suitable logic circuitry for this control sequence can be designed using prior art techniques.

Figure 17:
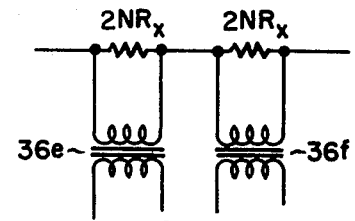
FIGS. 17 and 18 illustrate alternative connections for deriving a signal indicative of the total input cycloconverter current from a plurality of current transformers.
Figure 18:
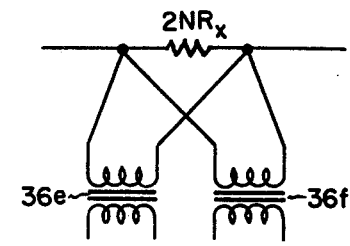

FIGS. 17 and 18 show the two possible sensor transformer connections to obtain the totalized cycloconverter current or commutating capacitor voltage. Using current transformers 36e and 36f for illustration, separate burden resistors with a value $2NR_x$ can be provided for each secondary winding which are then connected in series. Alternatively, both secondary windings can be connected across a single burden resistor having a value $2NR_x$.

The foregoing control technique assumes a cycloconverter control scheme where circulating current is prevented by blocking the thyristors of opposite polarity to the instantaneous low frequency currents. As was mentioned, when the input converter is regenerating and supplying power to the high frequency link, the output converter is delivering power to the load. Conversely, when the output converter is regenerating, the input converter now functions as a phase controlled rectifier and is delivering power to the source. Thus, the input and output converters are not driven to their retard limits at the same time, so that consideration of simultaneous firing of thyristors in the input and output converters near the retard limit need not be considered.

In summary, high frequency link cycloinverter and cycloconverter systems with a parallel resonant commutation circuit are operated at a variable frequency to control the reactive power available for commutation. The component of the firing circuit for generating a cycloconverter firing angle retard limit signal computes the timing of the firing of an incoming device so as to provide as a minimum a predetermined constant turn-off time for an outgoing device. In the case of the cycloinverter system there are approximately simultaneous commutations of devices in the inverter and cycloconverter, and additional circuitry is included to compute added turn-off time at least sufficient to commutate current from the outgoing device to the corresponding incoming cycloconverter device. The retard limit signal control circuit is relatively simple and achieves efficient operation of the converter system with improved reliability.

While the invention has been particularly shown and described with reference to several preferred embodiments thereof, it will be understood by those skilled in the art that the foregoing and other changes may be made in form and details without departing from the spirit and scope of the invention.

What is claimed is:

1. A cascaded power converter system comprising
a first power converter circuit and a second phase controlled converter power circuit each having a plurality of controlled power devices that are rendered conductive in sequence at a variable frequency to produce a desired output,
parallel resonant commutation circuit means connected in a link between said first and second converter circuits and including commutation instance means and parallel commutating capacitor means for supplying a variable amount of reactive power to selectively render said controlled power devices nonconductive, and
a firing circuit comprising means for generating a phase controlled converter firing angle retard limit signal which is comprised by a constant turn-off time control circuit for computing an approximately constant turn-off time for said power converter circuit controlled power devices, and further includes additional control circuitry for computing added time for turn-off to obtain approximately simultaneous turn-off of a selected first and second power circuit controlled power device.

2. A high frequency link cycloinverter system comprising
an inverter power circuit having at least a pair of thyristors that are alternately rendered conductive at a variable frequency,
a polyphase cycloconverter power circuit having in each phase a plurality of thyristors that are rendered conductive in sequence at a variable frequency to produce a desired output,
intermediate parallel resonant commutation means connected in a link between said inverter and cycloverter circuits and including commutating inductance means and parallel commutating capacitor means for supplying a variable amount of reactive power to selectively render said thyristors nonconductive, and
a firing circuit comprising retard limit signal means for generating a firing angle retard limit signal for each cycloconverter phase, said retard limit signal means including a constant turn-off time control circuit for computing the timing of firing signals for each incoming inverter thyristor to obtain an approximately constant turn-off time for each corresponding outgoing inverter thyristor, and further including an additional control circuit for computing the timing of firing signals to selected incoming cycloconverter thyristors at the retard limit to provide added turn-off time for each corresponding outgoing cycloconverter thyristor at least sufficient to commutate current from the outgoing to the incoming cycloconverter thyristor.

3. A converter system according to claim 2 wherein said control circuits comprise sensing means for sensing the instantaneous voltage of said commutating capacitor means and for sensing selected instantaneous power circuit currents indicative of the commutating capacitor means current after the firing of each incoming inverter thyristor and each incoming cycloconverter thyristor fired at the retard limit,
computation means for producing a cyclically varying retard limit control signal, and comparing means for comparing said retard limit control signal with a reference and generating said firing angle retard limit signal.

4. A converter system according to claim 3 wherein said sensing and computation means are provided by potential and current transformers, each current transformer having an associated burden resistor coupled across its secondary winding which is in turn coupled in series with each potential transformer secondary winding to form an analog circuit for producing said retard limit control signal.

5. A converter system according to claim 2 wherein said constant turn-off control circuit comprises sensing means for sensing the instantaneous voltage of said commutating capacitor means and for sensing at least one instantaneous inverter power circuit current indicative of the commutating capacitor means current after the firing of each incoming inverter thyristor, and said additional control circuit comprises sensing means for sensing the instantaneous cycloconverter current in each phase.

6. A converter system according to claim 5 wherein said sensing means in said additional control circuit comprises individual current sensors for each cycloconverter phase whereby separate firing angle retard limit signals are generated for each phase.

7. A converter system according to claim 5 wherein said sensing means in said additional control circuit comprises a common current sensor for sensing the total current in all the cycloconverter phases whereby a single firing angle retard limit signal is generated.

8. A converter system according to claim 5 wherein said control circuits further comprise computation means for producing at least one cyclically varying retard limit control signal having a zero-crossing, and comparing means for generating said firing angle retard limit signal upon the passage through zero of said control signal.

9. A converter system according to claim 8 wherein said retard limit signal has multiple zero-crossings, and time delay means for inhibiting the generation of spurious retard limit signals subsequent to the initial zero-crossing.

10. A high frequency link cycloconverter system comprising first and second polyphase cycloconverter power circuits each having in each phase a plurality of thyristors that are rendered conductive in sequence at a variable frequency to produce a desired output, intermediate parallel resonant commutation means connected in a link between said cycloconverter circuits and including commutating inductance means and parallel commutating capacitor means for supplying a variable amount of reactive power to selectively render said thyristors nonconductive, and a firing circuit comprising retard limit signal means for generating a firing angle retard limit signal for each cycloconverter circuit, said retard limit signal means including for each cycloconverter circuit a constant turn-off time control circuit for computing the timing of firing signals for each incoming thyristor at the retard limit to provide an approximately constant turn-off time for each corresponding outgoing thyristor, wherein each constant turn-off time control circuit comprises sensing means for sensing the instantaneous voltage of said commutating capacitor means and for sensing selected instantaneous power circuit currents indicative of the commutating capacitor means current after the firing of each cycloconverter thyristor at the retard limit, computation means for producing a cyclically varying retard limit control signal, comparing means for comparing said retard limit control signal with a reference and generating said retard limit signal, and said sensing and computation means are provided by potential and current transformers, each current transformer having an associated burden resistor coupled across its secondary winding which is in turn coupled in series with each potential transformer secondary winding to form an analog circuit for producing said retard limit control signal.

11. A converter system according to claim 10 wherein at least one potential transformer and at least one current transformer with its associated burden resistor are common to the constant turn-off time control circuits for both the first and second cycloconverter circuits.

12. A high frequency link cycloconverter system comprising first and second polyphase cycloconverter power circuits each having in each phase a plurality of thyristors that are rendered conductive in sequence at a variable frequency to produce a desired output, intermediate parallel resonant commutation means connected in a link between said cycloconverter circuits and including commutating inductance means and parallel commutating capacitor means for supplying a variable amount of reactive power to selectively render said thyristors nonconductive, and a firing circuit comprising retard limit signal means for generating a firing angle retard limit signal for each cycloconverter circuit, said retard limit signal means including for each cycloconverter circuit a constant turnoff time control circuit for computing the timing of firing signals for each incoming thyristor at the retard limit to provide an approximately constant turn-off time for each corresponding outgoing thyristor, wherein each constant turn-off time control circuit comprises sensing means for sensing the instantaneous voltage of said commutating capacitor means and for sensing a plurality of instantaneous power circuit currents indicative of the commutating capacitor means current after the firing of each incoming thyristor at the retard limit, and said sensing means includes a potential transformer and current transformer for sensing the instantaneous voltage and current of each separate commutating capacitor, and a current transformer in each cycloconverter phase to sense the instantaneous cycloconverter current, the outputs of the respective like transformers being effectively summed in said control circuit to obtain the total commutating capacitor voltage and current and total cycloconverter current.

13. A converter system according to claim 12 wherein each control circuit further includes computation means for producing a cyclically varying retard limit control circuit having a zero-crossing, and comparing means for generating said firing angle retard limit signal upon the passage through zero of said control signal.

14. A converter system according to claim 13 wherein said retard limit control signal has multiple zero-crossings, and time delay means for inhibiting the generation of spurious retard limit signals subsequent to the initial zero-crossing.

15. The method of producing a firing angle retard limit signal for a high frequency link converter system comprising a first power converter circuit and a second phase controlled converter power circuit each having a plurality of controlled power devices that are rendered conductive sequentially at a variable frequency to produce a desired output, intermediate parallel resonant commutation circuit means connected in a link between said converter circuits and including commutating inductance means and parallel commutating capacitor means for supplying a variable amount of reactive power to selectively render said controlled power devices nonconductive, and a firing circuit for said converters, said method comprising the steps of sensing selected power circuit parameters from which the future state of said commutating capacitor means can be predicted, computing from the sensed parameters and generating a cyclically varying retard limit signal which comprises as a minimum a constant turn-off time control signal for timing the firing of an incoming first power converter circuit controlled power device that obtains an approximately constant turn-off time for a corresponding outgoing first power converter circuit controlled power device, and deriving from said retard limit control signal a firing angle retard limit signal for the phase controlled converter controlled power devices, wherein said second phase controlled converter is a polyphase cycloconverter, and the computing and generating step further includes computing and generating another component of said retard limit control signal for producing added turn-off time at least sufficient to commutate current from one outgoing cycloconverter controlled power device to another corresponding incoming cycloconverter controlled power device.

16. The method according to claim 15 wherein the sensing step includes sensing the instantaneous cycloconverter current in each phase individually, the computing and generating includes generating a separate retard limit control signal for each phase, and the deriving step includes deriving individual firing angle retard limit signals for each cycloconverter phase.

17. The method according to claim 15 wherein the sensing step includes sensing the total instantaneous cycloconverter current in all the phases, and the computing and generating step and deriving step includes generating a single retard limit control signal and firing angle retard limit signal for all the phases.

18. The method of producing a firing angle retard limit signal for a high frequency link converter system comprising a first power converter circuit and a second phase controlled converter power circuit each having a plurality of controlled power devices that are rendered conductive sequentially at a variable frequency to produce a desired output, intermediate parallel resonant commutation circuit means connected in a link between said converter circuits and including commutating inductance means and parallel commutating capacitor means for supplying a variable amount of reactive power to selectively render said controlled power devices nonconductive, and a firing circuit for said converters, said method comprising the steps of sensing selected power circuit parameters from which the furture state of said commutating capacitor means can be predicted, computing from the sensed parameters and generating a cyclically varying retard limit signal which comprises as a minimum a constant turn-off time control signal for timing the firing of an incoming controlled power device that obtains an approximately constant turn-off time for a corresponding outgoing controlled power device, and deriving from said retard limit control signal a firing angle retard limit signal for the phase controlled converter controlled power devices, wherein said first and second power converter circuits are both polyphase cycloconverter power circuits, and the sensing step includes sensing the instantaneous, cycloconverter current components in the first and second cycloconverter power circuits and respectively summing the current components to obtain the total instantaneous current in each cycloconverter, the computing and generating step and deriving step include generating separate retard limit control signals and firing angle retard limit signals for the first and second cycloconverter power circuits, and the sensing step further includes sensing the instantaneous commutating capacitor means voltage and current components and respectively summing the last mentioned components to obtain the total instantaneous voltage and current of said commutating capacitor means.

19. The method according to claim 18 wherein the deriving step includes comparing said cyclically varying retard limit control signal to a zero voltage reference, and generating said firing angle retard limit signal at the initial zero-crossing of said retard limit control signal.

20. The method according to claim 19 wherein the driving step further includes inhibiting the generation of spurious firing angle retard limit signals at subsequent zero-crossings of said retard limit control signal.

* * * * *